US011176173B2

(12) United States Patent
Dilova et al.

(10) Patent No.: US 11,176,173 B2
(45) Date of Patent: Nov. 16, 2021

(54) ARRANGEMENT FOR ENRICHING DATA STREAM IN A COMMUNICATIONS NETWORK AND RELATED METHOD

(71) Applicant: Comptel Oy, Helsinki (FI)

(72) Inventors: Tereza Dilova, Sofia (BG); Yoakim Anastasov, Sofia (BG); Vasil Yordanov, Sofia (BG); Nikolay Milovanov, Sofia (BG); Desislava Dzhonova, Sofia (BG)

(73) Assignee: Comptel Oy, Helsinki (FI)

( * ) Notice: Subject to any disclaimer, the term of this patent is extended or adjusted under 35 U.S.C. 154(b) by 73 days.

(21) Appl. No.: 16/030,947

(22) Filed: Jul. 10, 2018

(65) Prior Publication Data
US 2020/0019638 A1    Jan. 16, 2020

(51) Int. Cl.
*G06F 16/27*    (2019.01)
*G06F 16/23*    (2019.01)

(52) U.S. Cl.
CPC ........ *G06F 16/275* (2019.01); *G06F 16/2379* (2019.01)

(58) Field of Classification Search
CPC .. G06F 16/275; G06F 16/2379; G06F 16/284; G06F 9/54; H04L 65/4069; H04W 8/18
See application file for complete search history.

(56) References Cited

U.S. PATENT DOCUMENTS 6,502,088 B1 *  12/2002  Gajda ................... G06F 16/252
10,191,663 B1 *  1/2019  O'Neill .................. G06F 3/065
(Continued)

OTHER PUBLICATIONS

Lawrence, Ramon, "Integration and virtualization of relational SQL and NoSQL systems including MySQL and MongoDB," 2014 International Conference on Computational Science and Computational Intelligence, vol. 1, IEEE, 2014. (Year: 2014).*

(Continued)

*Primary Examiner* — Jay A Morrison

(57) ABSTRACT

Electronic arrangement for use in enriching data stream with subscriber information in a communications network preferably comprising a mobile network, the arrangement comprising at least one data interface for transferring data, at least one memory for storing instructions and other data, and at least one controller for processing instructions and other data, said at least one controller being configured, in accordance with the stored instructions, to cause storing same data in a relational database, such as SQL database, preferably including subscriber related profile data, and in a non-relational, preferably in-memory, database; wherein responsive to receipt of a data write request, optionally from a network entity, BSS/OSS system or other external system, triggering data write in a single transaction incorporating data write into the relational database and replication into the non-relational database, wherein in the case of a failure having regard to the replication into the non-relational database, the at least one controller is further configured to execute an exception procedure; and responsive to receipt of a data retrieval query from a requestor, optionally from said network or other entity processing a data stream, and dependent on the type of the query, fetching data from the non-relational database or relational database, and returning it to the requestor or other selected target. Related method is presented.

20 Claims, 7 Drawing Sheets

(56) References Cited

U.S. PATENT DOCUMENTS

| | | | |
|---|---|---|---|
| 2015/0154524 A1* | 6/2015 | Borodow | G06Q 10/06313 |
| | | | 705/7.23 |
| 2016/0171070 A1* | 6/2016 | Hrle | G06F 16/273 |
| | | | 707/615 |
| 2017/0235818 A1* | 8/2017 | Gorski | G06F 16/172 |
| | | | 711/135 |
| 2018/0150526 A1* | 5/2018 | Nersisyan | G06F 16/244 |
| 2018/0239615 A1* | 8/2018 | Ravid | G06F 9/44505 |
| 2018/0329936 A1* | 11/2018 | Cole | G06F 16/2372 |
| 2018/0373739 A1* | 12/2018 | Tigli | G06F 16/211 |

OTHER PUBLICATIONS

Vilaça et al. "An effective scalable SQL engine for NoSQL databases," IFIP International Conference on Distributed Applications and Interoperable Systems, Springer, Berlin, Heidelberg, 2013. (Year: 2013).*

* cited by examiner

ARRANGEMENT FOR ENRICHING DATA STREAM IN A COMMUNICATIONS NETWORK AND RELATED METHOD

TECHNICAL FIELD OF THE INVENTION

The present invention pertains to communication networks and data processing therein. More specifically, however not exclusively, the invention concerns an arrangement and method for managing data such as mediation or provisioning data stream in a communications network.

BACKGROUND OF THE INVENTION

Various communication networks such as mobile and other wireless networks may generally process traffic, or traffic data, synchronously or asynchronously as generated by various devices with reference to end hosts, terminals, servers, etc. In the data handled or processed by the networks there may be unique identifiers included such as phone numbers, SIP (Session Initiation Protocol) URIs (Uniform Resource Identifier), IP (Internet Protocol) addresses, Skype™ profile IDs and many others that may identify the sender or receiver of the traffic, for example.

In modern contemporary communication systems, the network and its control plane, such as controllers in the case of an SDN (Software Defined Networking) or NFV (Network Function Virtualization), policy control and charging nodes, and/or the surrounding OSS (Operations Support System)/BSS (Business Support System) systems need to obtain more data about a user (subscriber), a company, other entity, or e.g. about a device that resides behind the identifiers so that they can take an appropriate action and process the traffic in an appropriate way.

Mediation refers in this context to collecting, storing (at least temporarily in terms of e.g. buffering) and processing, such as validation, filtering, transformation or conversion, sorting, copying, enriching and/or aggregation, of data such as UDRs (usage detail record) or specifically CDRs (call detail record) or IPDRs (internet protocol detail record) from various sources such as network elements into desired formats, collections and layouts for various purposes often including but not limited to billing. Other uses include e.g. traffic analysis, related capacity planning and network control operations such as network provisioning, fulfillment as well as a myriad of business intelligence uses.

Enriching e.g. stream type data based on other data made available in a data repository such as a database has been found challenging in a variety of ways. E.g. data consistency is one issue especially in large-scale distributed systems. With reference to CAP theorem, for instance, compromise between consistency and performance seems to prevail. Further, performance constituents such as latency of data access is a question that often pops up in real-time applications or applications where large amounts of data is enriched or otherwise processed. Yet, error situations and recovery therefrom has turned out problematic in some solutions. Still, limitations in the nature or complexity of data queries has posed trouble in the design of efficient interfaces for data retrieval.

SUMMARY OF THE INVENTION

In the light of foregoing, one objective of the present invention is to at least alleviate one or more of the above problems, which can be attained by the provision of an electronic arrangement, such as an electronic device, e.g. a server computer, or a system of multiple at least functionally such as communications-wise connected devices such as servers.

According to one aspect, an electronic arrangement for enabling, among further uses, enriching and potentially other cultivation of data stream with information such as subscriber information in a communications network preferably comprising a mobile network, the arrangement comprising at least one data interface for transferring data, at least one memory for storing instructions and other data, and at least one controller for processing instructions and other data, said at least one controller being configured, in accordance with the stored instructions, to cause:

storing same data in a relational database, such as SQL database, preferably including subscriber related profile data, and in a non-relational, preferably in-memory, database; wherein responsive to receipt of a data write request, optionally from a BSS/OSS or other external system, triggering data write in a single transaction incorporating data write into the relational database and replication into the non-relational database, wherein in the case of a failure having regard to the replication into the non-relational database, the at least one controller is further configured to execute a predefined or otherwise selected exception procedure; and responsive to receipt of a data retrieval query from a network entity processing a data stream, and dependent on the type of the query, fetching data from the non-relational database or relational database, and return it typically back to the requestor and/or other target entities when applicable.

Having regard to other possible target entities, there may be e.g. predefined requestor of data—target of (response) data pairs defined in the memory of the arrangement, or the target may be defined in connection with the query by the requestor or other instructing entity such as external system or external device.

In accordance with one other aspect, a method for retrieving and storing data for use e.g. in enriching data, such as mediation data stream, with further data, preferably comprising subscriber information, in a communications network advantageously comprising a mobile network, to be performed by an electronic arrangement comprising at least one electronic device, optionally a server computer, comprises:

storing same data in a relational database, such as SQL database, preferably including subscriber related profile data, and in a non-relational, preferably in-memory, database, wherein responsive to receipt of a data write request from e.g. a network entity, a BSS/OSS system or other source, triggering data write in a single transaction incorporating data write into the relational database and replication into the non-relational database, wherein in the case of a failure having regard to the replication into the non-relational database, the at least one controller is further configured to execute a predefined or otherwise selected exception procedure; and wherein responsive to receipt of a data retrieval query e.g. from the same or different source, and depending on the query or type of the query, data is fetched from the non-relational database or relational database, and returned towards the requestor and/or other entity if applicable.

According to a further aspect, software product, embodied in a non-transitory computer readable carrier medium, comprises instructions causing an executing computer to execute one or more method items described above and/or discussed hereinelsewhere.

The utility of the present invention arises from multiple factors depending on each particular embodiment thereof.

Generally, various embodiments of the present invention may be harnessed into providing, or assisting in providing, a real-time profiler or similar system for storing profile data at least in two databases (i.e. the very same data is replicated, or duplicated, in both databases) with reference to e.g. relational database or RDBMS (Relational Database Management Systems), such as Postgres SQL™ database, and non-relational, or NOSQL (Not only Structured Query Language) database, such as Couchbase™ or other in-memory type database. Use of relational, transactional database facilitates guaranteeing ACID (Atomicity, Consistency, Isolation, Durability) whereas non-relational database yields good performance of read operations and network partitioning and availability, for instance.

In various embodiments, the data in the non-relational database may be accessed directly by utilizing a primary key, which may optionally be of natural or surrogate, optionally also composite, type, for instance.

In various embodiments, a specific procedure for the synchronization of data write operations, such as Create, Update and Delete, between the two databases of different nature is implemented in a single transaction thus preserving data consistency across both databases.

As alluded to hereinbefore, one preferred application of various embodiments of the suggested solution is in telecommunication sector and specifically, e.g. in mediation, provisioning, or fulfillment in order to enrich e.g. subscriber related stream data as in such streaming context, the executing system has to be capable of rapidly processing (read/write) large amounts of various data with high level of accuracy and reliability. As being appreciated by a person skilled in the art, different embodiments of the present invention may easily find use also in other use context having the aforementioned and/or other requirements.

In various embodiments, simpler data searches or inquiries such as user/subscriber data searches are rapid to execute via the non-relational database based on e.g. explicit, or fully defined, input search term or search identifier (e.g. profile name, phone number, URI, etc.) that is converted to search (primary) key to address correct data within the database.

In various embodiments, more complex or advanced operations such as wildcard type searches (e.g. complex SQL LIKE search strings) can be executed, in turn via the relational database (e.g. SQL) more suitable for such searches, still preferably utilizing applicable search terms or identifiers for defining at least part of the search conditions e.g. together with wildcard operators.

In various embodiments, concerning the write operations, the relational database is preferably targeted first (it may be deemed "source of truth"). Items that have to retain consistency may comprise e.g. key ID's that drive or address the data. The "source of truth" for them is preferably the relational database. Thus such items are first written into the relational database; if the write operation is successful then the data will be written into the non-relational database as well. These actions are advantageously done in the same transaction. If the write into the non-relational database fails an exception procedure comprising e.g. rollback is available for the relational database.

In various embodiments, instead of subjecting the relational database to rollback, based on the data already duly captured in the relational database, the non-relational database is synced to host a copy of such data when operational again.

In different applications, various embodiments of the present invention are considered advantageous as the data consumers or users:
1. may obtain the data with a very good performance (mediation context) such as low latency, especially having regard to the non-relational database;
2. The data is correct (considering e.g. mediation/(online) charging/provisioning and similar applications) and relevant, which enables making key business decisions related to the data, e.g. some particular subscriber;
3. When needed, a number of more complex, e.g. SQL type of, data queries may still be executed for e.g. dashboard functionality using the relational database, which are difficult and/or slower to execute with the non-relational databases.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, may be best understood from the following description of specific, still merely exemplary, embodiments when read in connection with the accompanying drawings.

Finally, numerous considerations provided herein concerning different embodiments of the arrangement may be flexibly applied to the embodiments of the method mutatis mutandis, and vice versa, as being appreciated by a skilled person.

Various different embodiments discussed herein may be freely and selectively combined by a person skilled in the art to come up with further useful embodiments, unless clearly disclosed herein as mutually exclusive or alternative.

The expression "a number of" refers herein to any positive integer starting from one (1), e.g. one, two, or three.

The expression "a plurality of" refers herein to any positive integer starting from two (2), e.g. two, three, four.

BRIEF DESCRIPTION OF THE DRAWINGS

Next the invention will be described in greater detail with reference to exemplary embodiments in accordance with the accompanying drawings, in which.

DETAILED DESCRIPTION

One common feature underlying various different embodiments of the present invention is in having a relational database or RDBMS (Relational Database Management System) and non-relational database such as NOSQL (Not only Structured Query Language) replicating the same data in parallel in favor of obtaining e.g. desired aspects of ACID (Atomicity, Consistency, Isolation, Durability) and solid real-time performance of associated read operations and network partitioning as well as data availability.

Various embodiments of the suggested solution are particularly, but not solely, configured for use in the context of communication such as mobile networks for purposes such as mediation or provisioning, wherein the data written, stored and read may particularly include e.g. subscriber/subscription associated profile data that can be used to cultivate (supplement and/or otherwise enrich, for instance) desired data streams, for instance. As the solution yields good performance, it is well suitable for real-time or online processing, but also offline use is fully feasible.

Transaction unit-based processing is advantageously utilized in various embodiments for assuring the coherency between data in the databases.

Figure 1:
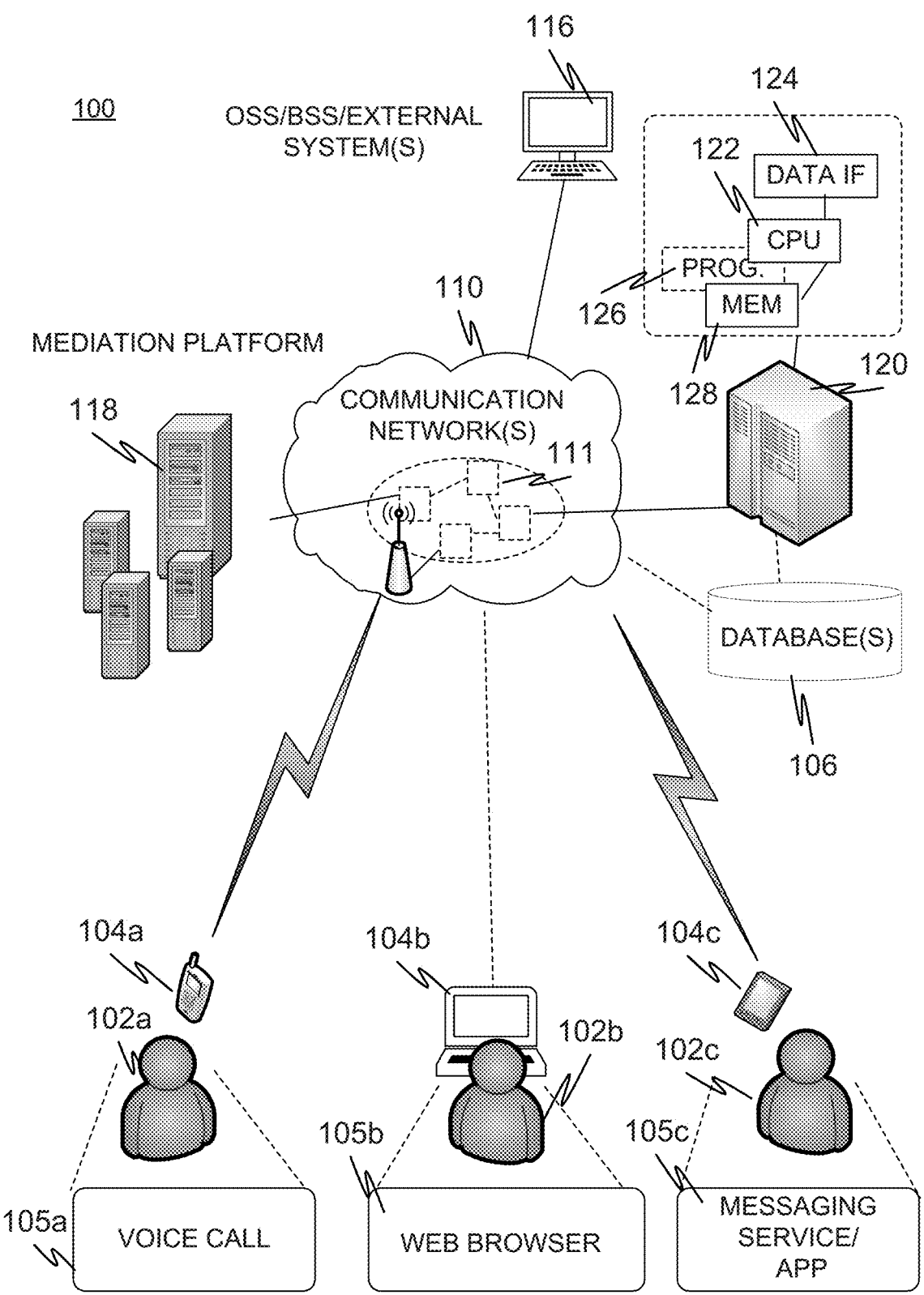
FIG. 1 illustrates a use context and related entities for an embodiment of an electronic arrangement in accordance with the present invention.

With reference to scenario 100 shown in FIG. 1, various different embodiments of the present invention may be utilized in connection with at least one communication network 110, which may include, besides a number of "wired" networks, one or more wireless networks comprising e.g. a number of mobile networks of so-called 3G, 4G or 5G type, optionally incorporating e.g. NFV (network function virtualization) based networks and/or hybrid networks incorporating features from both traditional (proprietary) mobile networks and NFV architecture.

In the visualized scenario, a plurality of subscribers, or generally users, 102a, 102b, 102c has been provided with access to terminal devices 104a, 104b, 104c, such as mobile terminals (e.g. smartphones, tablets, laptop computers, or more static terminals such as desktop computers in order to access the network 110 and related services such as voice calls 105a, internet access 105b (e.g. web browsing), messaging services 105c, etc. The terminals 104a, 104b, 104c may be essentially personal or used by multiple persons.

The arrangement 120 for enriching mediation data relating to the aforesaid subscribers 102a, 102b, 102c and/or for other use(s) may contain at least one processing unit 122 such as a microprocessor, microcontroller and/or a digital signal processor. The processing unit 122 may be configured to execute instructions embodied in a form of computer software 126 stored in a memory 128, which may refer to one or more memory chips, for example, separate or integral with the processing unit 122 and/or other elements.

The memory 128 may store various further data in addition to mere program instructions. It may, for example, host any of the aforementioned databases such as one or more relational and/or non-relational databases, being also designated a specific element 106 in favor of clarity in the figure. Any of the databases could alternatively be external to the arrangement 120 and only provide interface, e.g. API (application programming interface), for the arrangement 120 for executing operations such as CRUD.

The software 126 may define e.g. one or more applications for executing the activities described herein. A computer program product comprising the appropriate software code means may be provided. It may be embodied in a non-transitory carrier medium such as a memory card, an optical disc or a USB (Universal Serial Bus) stick, for example. The software could also be transferred as a signal or combination of signals wired or wirelessly from a transmitting element to a receiving element.

Item 124 refers to one or more data interfaces such as wired network and/or wireless network interfaces, or in practice network adapters, for providing communication capability to the arrangement 120 to exchange data with external systems and elements. An UI (user interface) such as a web-based UI or other remote UI may be provided and optionally at least partially implemented by means of the interface 124.

Item 118 refers to at least one sub-system or entity, comprising e.g. one or more servers, present or at least functionally connected to the network 110. The item 118 may refer to e.g. mediation platform or system that utilizes and optionally incorporates the arrangement 120 of the present invention. The arrangement 120 may be generally hosted by a number of dedicated (exclusive) and/or non-exclusive servers (and/or other devices), for instance.

A plurality of further elements such as network elements 111 not depicted in FIG. 1 in more detail may also be comprised in the network 110, with reference to e.g. various policy control, provisioning/fulfillment, etc. entities.

Item 116 refers to one or more external devices or systems that are at least functionally connected to the network 110 and e.g. arrangement 120 and/or mediation or other platform 118 therein, if not included therein. For example, OSS and/or BSS systems may be illustrated by item 116.

Figure 2:
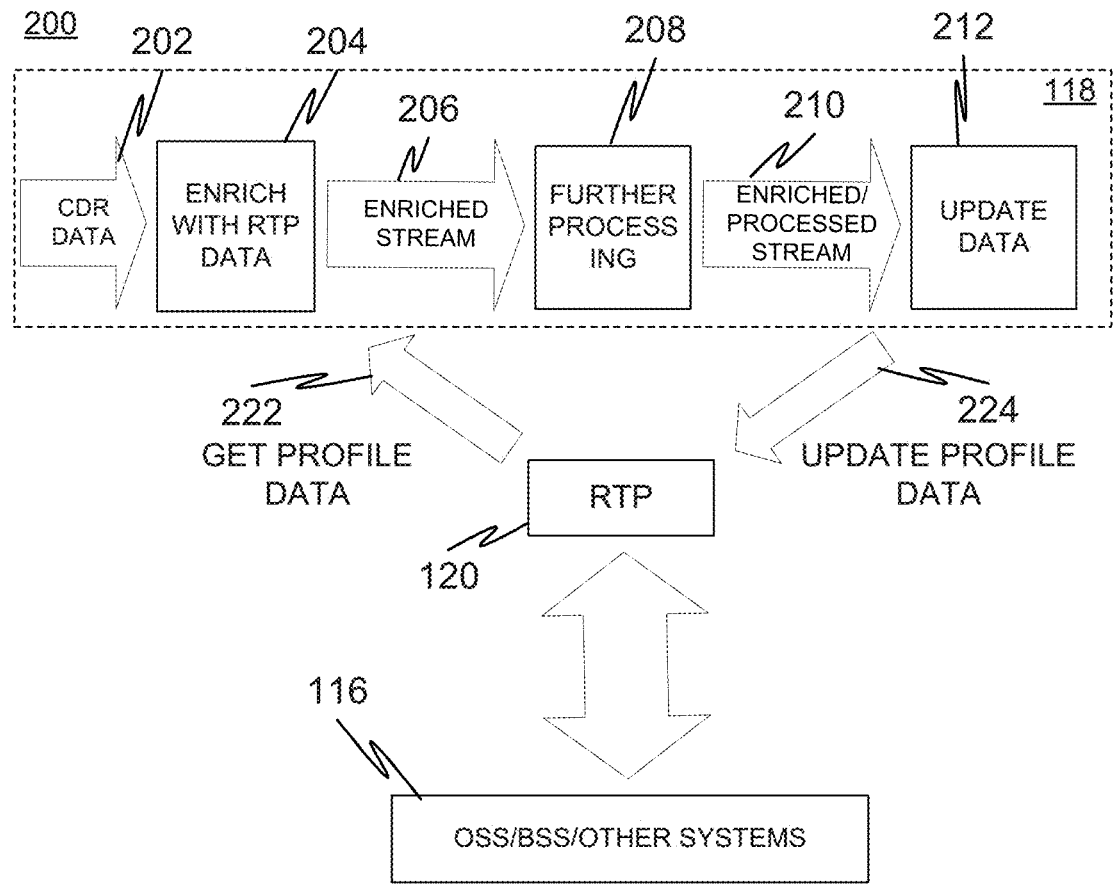
FIG. 2 illustrates a possible functional relationship between e.g. a mediation platform, client systems and an embodiment the arrangement of the present invention.

FIG. 2 illustrates, at 200, a possible use scenario and related potential functional relationships between e.g. a mediation or other online or real-time system or platform 118, arrangement 120 in accordance with an embodiment of the present invention and various client or other systems 116 functionally cooperating with the arrangement 120 (reading and/or writing data). The arrangement 120 as such may comprising one or more devices such as servers, in the latter case the servers being functionally connected in terms of e.g. control signalling and/or other data exchange.

As being comprehended by a person skilled in the art and already alluded to above, in some embodiments the arrangement 120 may be at least partially integrated with other entity, such as system 118 or other system 116.

Generally, e.g. mediation type system 118 may be configured to enrich its stream data with data provided by the arrangement 120 through performing queries by data identifier(s), processing the data and/or finally updating, 212, 224 also data records in the database(s) of arrangement 120.

Alternatively or additionally, e.g. simultaneously with system 118, a number of other systems 116 may be configured to trigger or execute e.g. one or more of CRUD (Create, Read, Update, Delete) operations on the data stored in the database(s).

In more detail, e.g. in the case of mediation type system 118, stream data 202 including e.g. CDR, UDR and/or IPDR data, and/or other desired data indicative of e.g. service or application usage by subscribers or other entities, may be enriched 204 by data 222 such as subscriber or generally user data, comprising e.g. (subscriber) profile data, provided by the arrangement 120 (RTP, real-time profiler, indeed represents one preferred embodiment and usage of the present invention), with reference to operations discussed hereinbefore, for instance.

Enriching may include, but not limited to, refining, modifying or correcting, and/or augmenting data, for instance. The data such as CDR data to be enriched may be thus supplemented or otherwise improved by enriching operation utilizing e.g. the queried profile data 222. Alternatively or additionally, the data 202, 206 may be subjected to further processing and related operations 208, 210 enhancing the value of the data e.g. in the mediation context, with reference to extrapolation, interpolation, calculation of indicators and/or statistics, aggregation tasks, and/or filtering, for example.

While various embodiments of the present invention are considered having of particular value in connection with stream processing and/or real-time processing, it is naturally suitable for serving other users e.g. in connection with batch processing.

Preferably, various embodiments of the present invention are nevertheless realized so as to be able to write the desired data consistently to both relational database(s) and non-relational (replication) database(s). A procedure involving execution of synchronization of data write operations (create, update, delete) between the databases of both types in a single transaction is therefore considered advantageous.

"Transaction" refers to a unit of work performed within the arrangement 120 or similar database management system against database(s), and is treated in a coherent and reliable way preferably independent of other transactions.

A skilled person shall realize that the requirement of "single transaction" could be loosened or omitted in some use contexts in favor of some other desired property, but such omission or loosening should be executed in response to careful evaluation.

In various embodiments, data write may be thus deemed failed if one or more of a number of selected components such as a relational database is not operational, which is followed by proceeding in accordance with an associated, typically predefined exception procedure.

In some embodiments, wherein e.g. non-relational database is non-operational but returns e.g. error flag or error code (e.g. sync error) while the data has still already been successfully written in the relational database, the data could be duly synced (written) to the non-relational database based on data in the relational database, when the non-relational database is back up (operational).

In the context of communication such as telecommunication networks and e.g. mediation, very rapid access to subscriber profile data may be offered by embodiments of the present invention based on e.g. profile identifiers using non-relational database.

However, it is also convenient to execute a more complex, e.g. a wildcard type (e.g. range type), search for data such as particular profiles (for example those profiles that match search condition regarding e.g. MSISDN number +359898*, wherein * refers to any number or numbers), using relational database.

Accordingly, in various embodiments, e.g. CRUD operations to profile or other stored data may be offered to other systems by performing fast data reads from the non-relational database(s) while guaranteeing that the data in the system is consistent and verified against relational database constraints.

Figure 3:
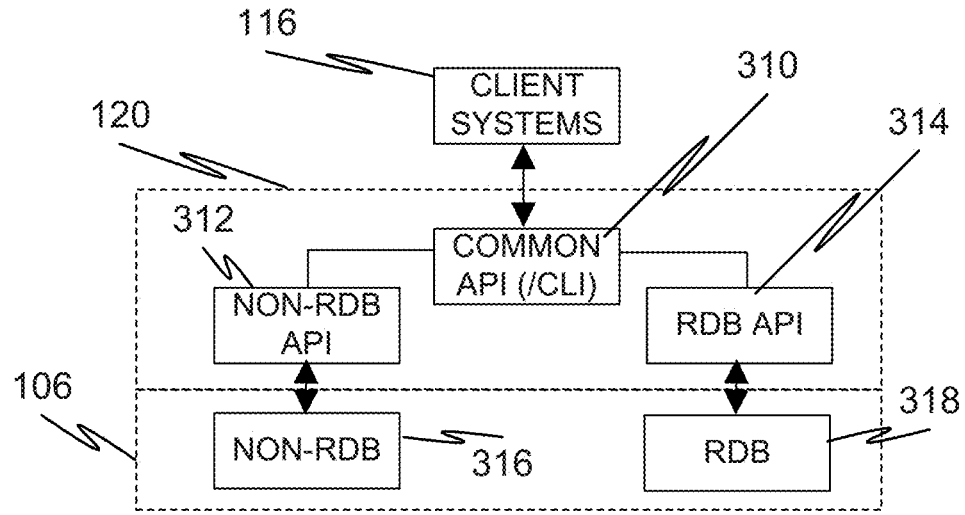
FIG. 3 illustrates an embodiment of the arrangement and related connectivity.

FIG. 3 illustrates, at 300, an embodiment of the arrangement and related connectivity towards other entities, such as client systems 116.

The non-relational database 316 and relational database 314, or any of them, may in some embodiments establish a part of the actual arrangement 120, or be only connected thereto via applicable data interfaces.

A feature such as common API 310 may be provided to receive e.g. input from external system(s) 116 and perform or trigger related operations preferably including one or more of CRUD operations on data stored in the databases 316, 318.

A RDB API 314 for enabling accessing the relational database 318 is configured to enable performing e.g. CRUD operations against a data model stored in relational database or database management system 318.

A NOSQL API 316 is, in turn, configured to enable accessing and performing e.g. CRUD operations having regard to data stored in the non-relational database or database management system 316, through accessing each data structure in the database by a primary key, for instance.

In some embodiments a feature including e.g. CLI (command line interface) utility may be provided to perform data synchronization operations of e.g. profile data between the relational 318 and non-relational 316 databases. The feature may be configured to receive as input parameter e.g. one or more profile IDs or other IDs based on which data is obtained from the relational database 318 and upserted or deleted from the non-relational database 316, for instance.

Figure 4:
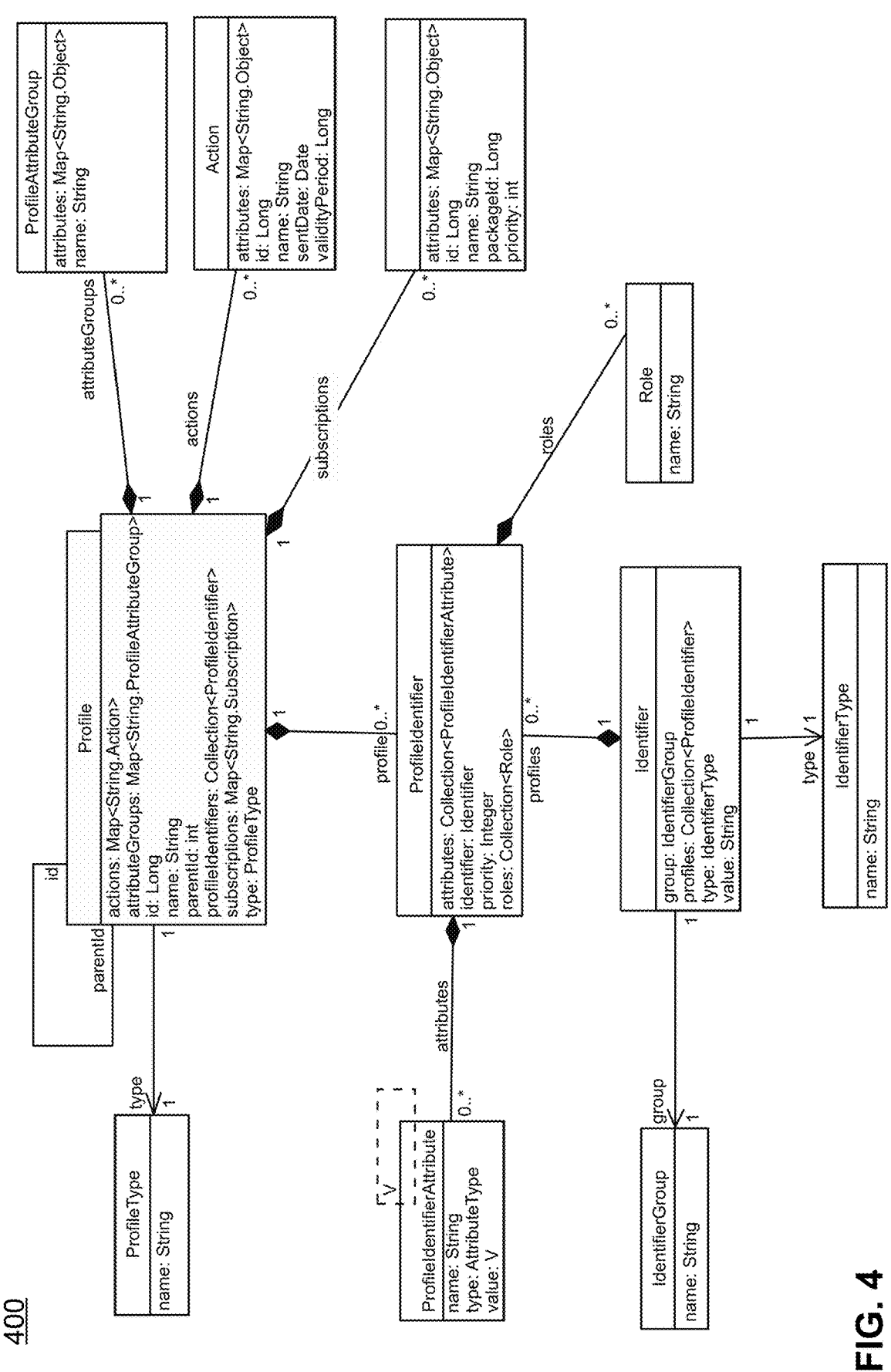
FIG. 4 illustrates an embodiment of an applicable common API data model for user or subscriber profile data.
Figure 5:
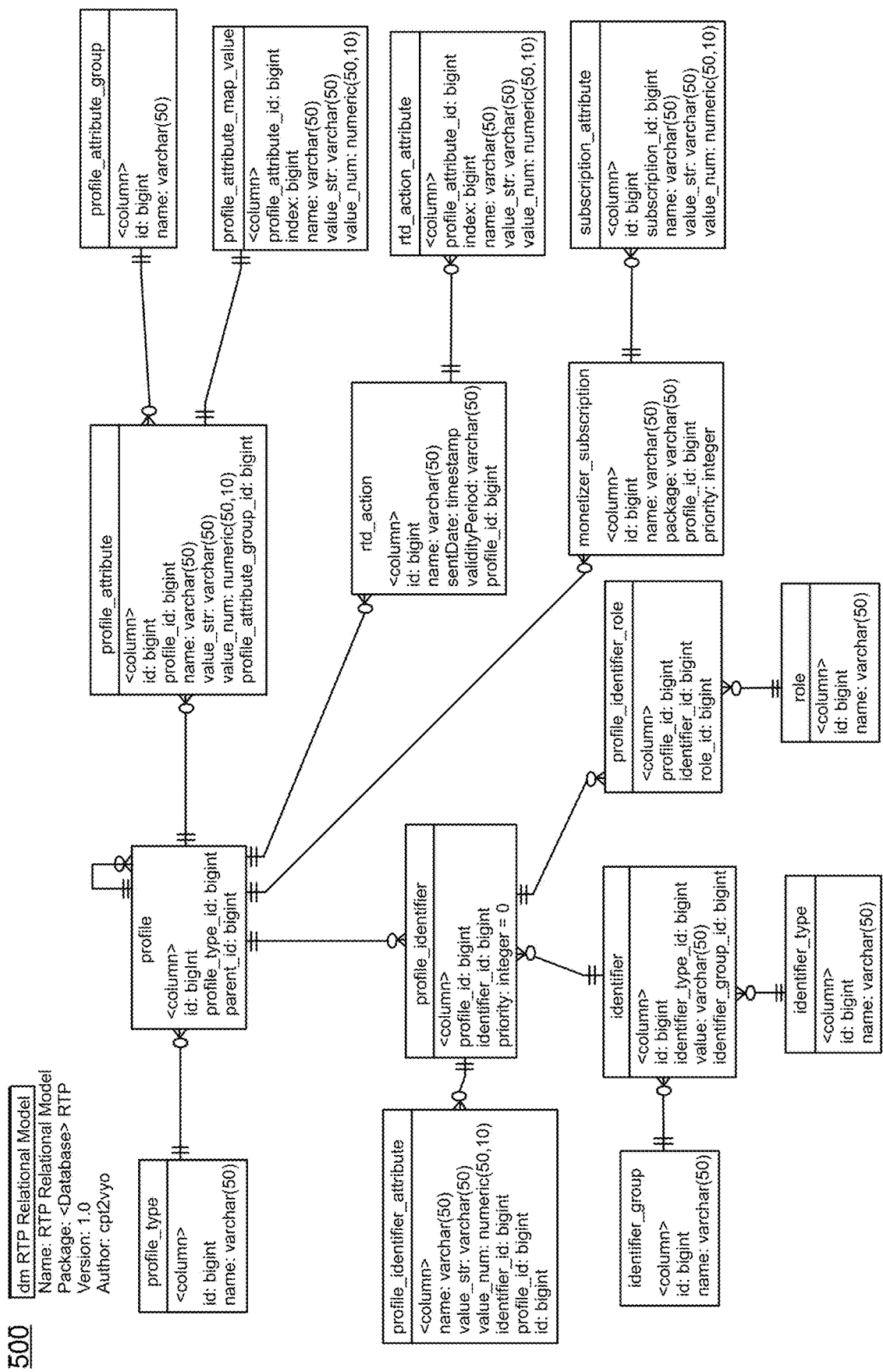
FIG. 5 illustrates an embodiment of relational database data model.

Next, both FIG. 4 and FIG. 5 are referred to.

FIG. 4 illustrates, at 400, an embodiment and example of an applicable common API data model for e.g. user or subscriber profile data (shown and considered as one potential application area). FIG. 5 illustrates, at 500, an embodiment of applicable relational database data model.

The arrangement 120 may be thus configured to at least partially expose the data model shown in the figure to various client systems 116 through associated data access or manipulation operations such as CRUD operations, for instance.

In more detail, the data model may comprise profiles with name and unique identifier that relate to each other e.g. in a parent-child way, attributes of those profiles that have a name and value and are grouped in attribute groups with selected name.

Depending on the use case, profile data may be extended, or enriched, with additional data such as subscriptions that represent e.g. the services the profile owner has subscribed to (e.g. in and/or via the concerned communication network) and/or actions sent by the network elements towards the user. An example of such action is a message such as SMS (short message service) sent towards the owner of an MSISDN identifier with content such as text string.

Profiles typically relate to identifiers that have a type and value and may belong to an IdentifierGroup. The relationship between the profile and the identifier is many-to-many and is realized through the ProfileIdentifier entity.

A profile may relate to many identifiers and one identifier might be used by a multiple profiles). The ProfileIdentifier entity has attributes with name and value and a role. An example role is owner (i.e. which profile is the owner of the identifier, for instance).

Preferably, the data stored is organized in the relational database in multiple tables that relate to each other through a number of foreign keys. The tables may have indexes, primary keys and unique constraints.

Preferably, the data stored in the non-relational database is organized in distinct data structures. An entity of each data structure may be accessed by a primary key by the arrangement.

The structures may include e.g. profile, subscription and action data structures and a binding data structure representing the identifier.

See the merely exemplary descriptors below:
Profile:

```
key:prf:id
    id
    name
    parent_id
    type
    attribute_group {groupId}
        name
        attribute {attributeId}    name, attribute {attributeId} value
        attribute {attributeId}    name, attribute {attributeId} value
    attribute_groupN
        name
        attribute {attributeId}    name, attribute {attributeId} value
        attribute {attributeId}    name, attribute {attributeId} value
    subscriptions
        subs_{subscriptionId}_{priority}
    rtd_actions
        action_{actionId}
        action_{actionId}
```

Identifier:

```
key: identifier:type:value
identifierType: type
id: value
profiles
    profile:id=profileId
        role: owner
        type: family
        subscriptions
            subs_{subscriptionId}_{priority}
        actions
            action_{actionId}
    profile:id=profileId
        role:
        subscriptions
            subs_{subscriptionId}_{priority}
        actions
            action_{actionId}
```

Subscription:

```
subscrions:profileId
    subs_{subscriptionId}_{priority}
        id = 1
        priority =1
        package = "package_name"
        attribute XX name, attribute XX value
        attribute ZZ name, attribute ZZ value
    subs_{subscriptionId}_{priority}
        id = X
        priority =X
        package = "package_name"
        attribute XX name, attribute XX value
        attribute ZZ name, attribute ZZ value
```

Actions:

```
actions:profileId
    action {actionId}
        id {actionId}
        name
        sent_date
        validity_period
        description
        attribute {attributeId} name, attribute {attributeId}value
    action {actionId}
```

-continued

```
        id {actionId}
        name
        sent_date
        validity_period
        description
        attribute {attributeId}name, attribute {attributeId}value
```

Figure 6:
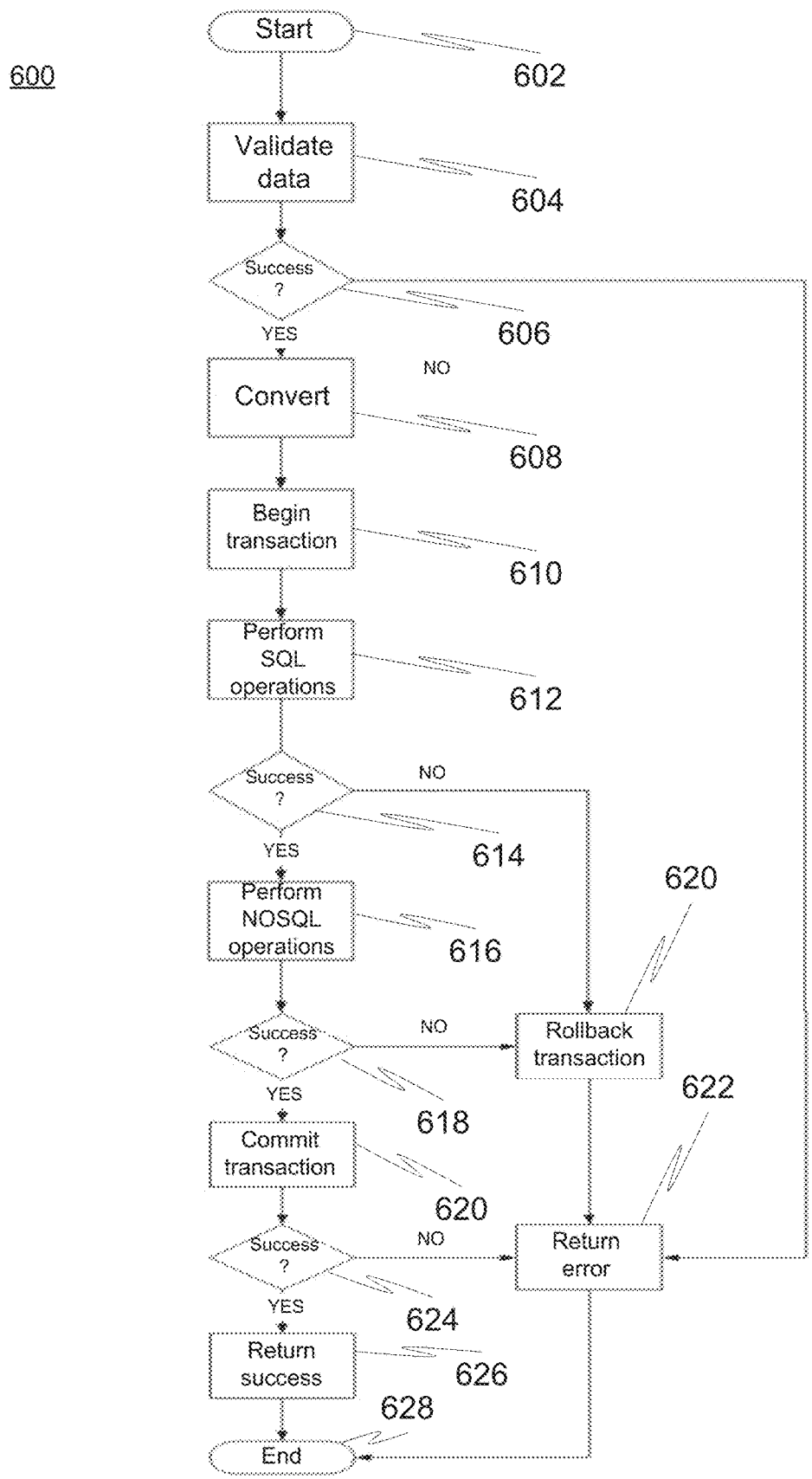
FIG. 6 is a flow diagram concerning an embodiment of data write operations in accordance with the present invention.

FIG. 6 shows, at 600, a flow diagram concerning an embodiment of data write (e.g. create, update, delete) operations in accordance with the present invention. The concerned method or sub-method may be performed by an electronic arrangement, such as a device or a system of a number of at least operatively connected devices, as described hereinearlier.

Again, one preferred feature here is to ensure consistent write operations to relational database and non-relational database (replication) utilizing e.g. a single transaction model described herein.

At start-up 602, different initial preparatory tasks may be executed. The executing arrangement, for example, may be configured with the necessary hardware and software (with reference to a number of servers, for example) and provided in or connected to the target network with necessary connections to other entities in and/or outside the network.

At 604, the process may be continued with, in principle optional but preferred, validation of the input data e.g.va in the "Common API".

If the validation is unsuccessful 606 "no", an error may be returned and/or other exception procedure executed 622.

If the validation is successful 606 "yes", the process may be continued at 608 with the conversion the input data, or common API data structure, to data (format) that is compatible with the non-relational and Relational API components and e.g. underlying data models.

Once this is done the system begins a transaction at 610 preferably in read committed mode and performs the queries or generally operations (e.g. SQL) 612 required for the execution of the data write operation having regard to the relational database.

If any of the queries or operations fails 614 "no", at least one exception procedure such as rollback may be executed 620 in relation to the transaction and e.g. an error returned 622.

If the queries or operations are successful 614 "yes", the process may continue with a data write through the non-relational database API 616.

If that write operation is unsuccessful 618 "no", the arrangement may rollback 620 the transaction and/or return an error 622, and/or execute other exception procedure. If it is successful 618 "yes", the arrangement may end or specifically commit 620 the transaction (making the made changes permanent, visible and/or releasing the resources reserved, for example) and return successful result 626. If the commit fails 624 "no", an error may be triggered 622. At 628, method execution is ended.

Figure 7:
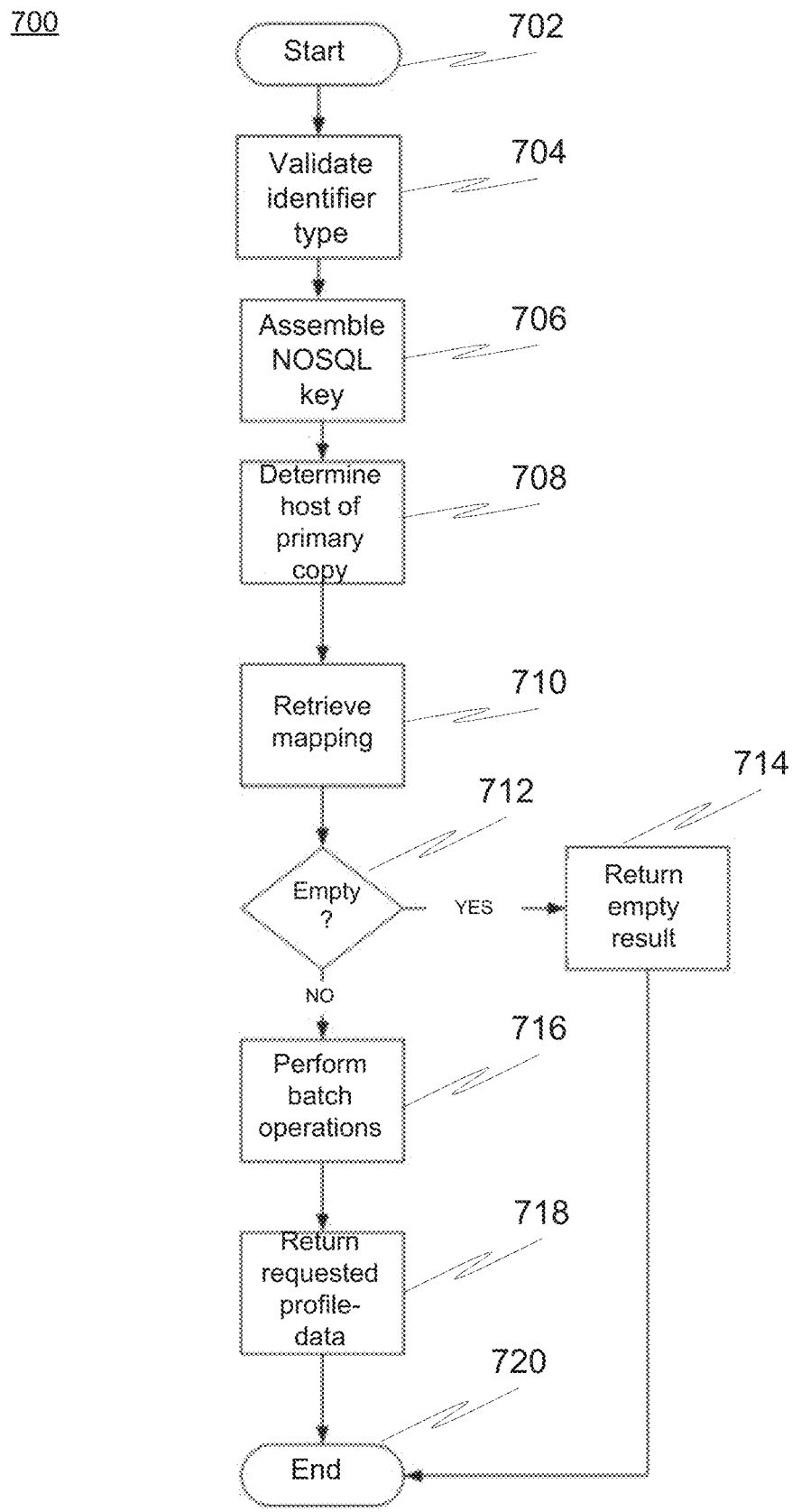
FIG. 7 is a flow diagram concerning an embodiment of data access (retrieval) in accordance with the present invention.

FIG. 7 shows, at 700, a flow diagram concerning an embodiment and example of data access (retrieval) in accordance with the present invention. The concerned method or sub-method may be performed by an electronic arrangement, such as a device or a system of a number of at least operatively connected devices, as described hereinearlier.

The shown example is related to non-relational database access, but similar measures could be generally taken having regard to access via the relational database as being comprehended by a person skilled in the art. Which database to utilize for the data access, may be determined e.g. by the executing arrangement based on the type of the request (e.g. complexity of the query/use of wildcards as explained hereinelsewhere) and/or other criterion, e.g. database availability or other status.

At start-up 702, different initial preparatory tasks may be executed. The executing arrangement, for example, may be configured with the necessary hardware and software (with reference to a number of servers, for example) and provided in or connected to the target network with necessary connections to other entities in and/or outside the network.

At 704, validation of the identifier included in or referred to in a data request may be executed.

At 706, based on the identifier a database key may be determined, and at 708, also non-relational database host on which the primary replica of the target data structure resides.

At 710, identifier mapping data such as document may be retrieved. If not empty 712 (which triggers item 714), based on the information included and the used request method, any desired or all of the profiles, subscriptions and/or actions related to the identifier may be then returned in a batch query operation at 716. Item 718 refers to returning the requested data such as profile data. At 720, method execution is ended.

Figure 8:
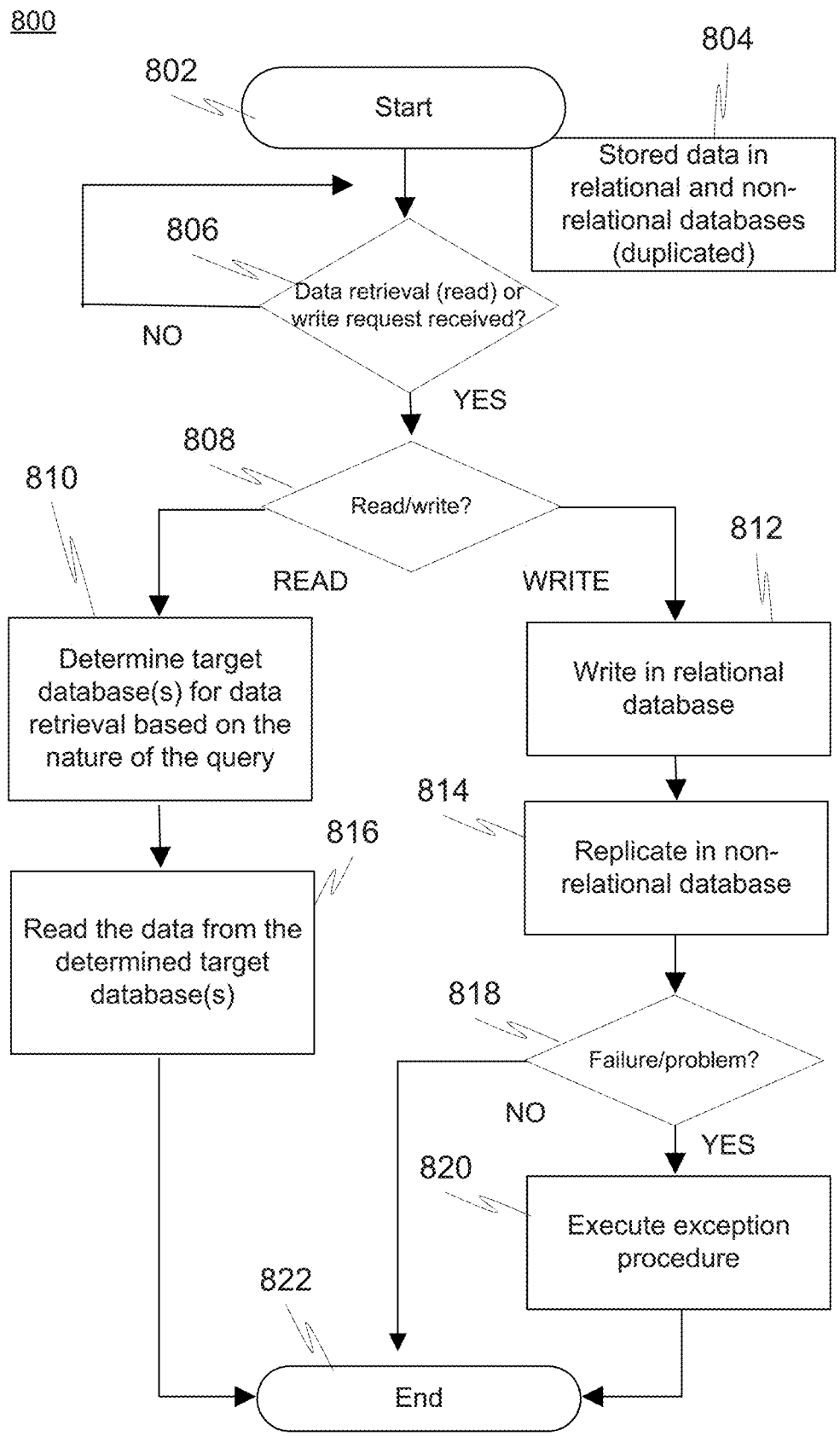
FIG. 8 is a flow diagram generally concerning an embodiment of a method in accordance with the invention.

FIG. 8 illustrates, at 800, items that may be performed in a method according to an embodiment of the invention. The method may at least selectively contain any method or method item of previous sub-methods disclosed in FIGS. 6 and 7 for data write and retrieval (read) purposes, as being clear based on the description of FIGS. 6 and 7 provided hereinbefore, and description of a more generic overall method of FIG. 8.

The method may be performed by an electronic arrangement, such as a device or a system of a number of at least operatively connected devices, as described hereinearlier.

At start-up 802, different initial preparatory tasks may be executed. The executing arrangement 120 of FIG. 1, for example, may be configured with the necessary hardware and software (with reference to a number of servers, for example) and provided in the target network with necessary connections to other entities in the network.

Item 804 refers to generally having data stored in at least one relational and at least one non-relational database so that same data is stored in both (i.e. data is stored as duplicated). Having data first stored in the databases using e.g. a write method disclosed in the right branch emerging from decision point 808 is a logical requisite for successfully retrieving data therefrom (left branch of 808).

Item 806 refers to receipt of database query e.g. via the previously discussed common API or other interface, for instance.

At 808, dependent on the type or nature of the request or query received (is it about retrieval of data stored in the database or data write thereinto), the execution turns into one of two potential paths.

In the read/data retrieval or "select" path, at 810 based on the nature such as complexity and/or other type of the query or request, target database(s) for read operation(s) is selected, and read operation(s) correspondingly executed at 816. Suitable search terms may be determined (including e.g. database keys) and related query mechanisms executed. Additional or alternative criteria could also be utilized for the selection.

As contemplated hereinbefore, e.g. wildcard type more complex or advanced searches are preferably executed by reading from the relational database whereas relatively simpler, or more explicit or specific, queries (e.g. without wildcards) are generally more rapid to execute via the non-relational database.

In the write or "action" path, write is preferably first executed in the relational database at 812, followed by replication in the non-relational database 814. Feasible, more specific, (sub-)embodiments of data write and read processes can be found from the above-reviewed FIGS. 6 and 7, respectively.

In the case of failure or other predefined condition monitored and detected at 818, exception procedure(s) may be executed at 820 including e.g. rollback, with reference to the embodiment of FIG. 6, for example.

Method execution ends at 822.

The present invention has been explained above with reference to a number of embodiments, and several advantages of the invention have been demonstrated. It is clear that the invention is not only restricted to these embodiments, however, but comprises further embodiments within the spirit and scope of inventive thought and especially within scope of the following patent claims.

The features recited in dependent claims are mutually freely combinable unless otherwise explicitly stated or being clear to a person skilled in the art due to inherent incompatibility.

The invention claimed is:

1. An electronic arrangement for use in enriching data stream with subscriber information in a communications network, the arrangement comprising at least one data interface for transferring data, at least one memory for storing instructions and other data, and at least one controller for processing instructions and other data, said at least one controller being configured, in accordance with the stored instructions, to cause:

storing same data in a relational database and in a non-relational database; wherein responsive to receipt of a data write request, triggering data write in a single transaction incorporating data write into the relational database, replication into the non-relational database, and execution of an exception procedure in the case of a successful data write operation to the relational database and failure regarding to the replication into the non-relational database; and responsive to receipt of a data retrieval query from a requestor and dependent on the type of the query, fetching data from the non-relational database or relational database, and returning it to the requestor or other selected target.

2. The arrangement of claim 1, wherein the exception procedure comprises subjecting the relational database to a rollback operation or maintaining the written data in the relational database to replicate it into the non-relational database subsequent to recovery from the state of failure.

3. The arrangement of claim 1, wherein the relational database comprises a structured query language (SQL) database.

4. The arrangement of claim 1, wherein the non-relational database comprises a not only structured query language (NOSQL) database.

5. The arrangement of claim 1, configured to enrich mediation or other substantially real-time or online data stream, with other data stored in the relational and non-relational databases.

6. The arrangement of claim 1, configured to execute create, read, update or delete (CRUD) operation on the data stored or to be stored in the relational and non-relational databases responsive to and dependent on the received data write request or data query.

7. The arrangement of claim 1, wherein the exception procedure comprises a rollback procedure having regard to the relational database and/or error signalling.

8. The arrangement of claim 1, comprising at least one application programming interface (API), other interface or corresponding feature selected from the group consisting of: common API for receiving external requests such as data queries or write requests to be executed having regard to any of the relational and non-relational database as well returning the result or related acknowledgement of the performed operations, relational database API for performing read and write operations with respect to the relational database, and non-relational database API for performing read and write operations with respect to the non-relational database.

9. The arrangement of claim 1, configured to execute a more complex or advanced data retrieval query via the relational database, and a simpler data retrieval query via the non-relational database.

10. The arrangement of claim 1, wherein the communications network includes a mobile network.

11. The arrangement of claim 3, wherein the relational database includes subscriber related profile data and the non-relational database is an in-memory database.

12. The arrangement of claim 1, wherein the data write request is from a network entity, business support system (BSS)/operations support system (OSS)system or other external system.

13. The arrangement of claim 1, wherein the requestor is from said network or other entity processing a data stream.

14. The arrangement of claim 5, wherein the real-time or online data stream includes call detail record (CDR), usage detail record (UDR) and/or internet protocol detail record (IPDR) data.

15. The arrangement of claim 14, wherein the other data includes subscriber related profile data, stored in the relational and non-relational databases.

16. The arrangement of claim 8, wherein the non-relational database API for performing read and write operations with respect to the non-relational database utilizes a primary key.

17. The arrangement of claim 9, wherein the more complex or advanced data retrieval query includes a wild card request and the simpler data retrieval query is based on at least one fully defined search identifier.

18. A method for managing data in a communications network advantageously comprising a mobile network, to be performed by an electronic arrangement comprising at least one electronic device, comprising:
  storing same data in a relational database and in a non-relational database, wherein responsive to receipt of a data write request, triggering data write in a single transaction incorporating data write into the relational database, replication into the non-relational database, and execution of an exception procedure in the case of a successful data write operation to the relational database and failure regarding the replication into the non-relational database; and
  responsive to receipt of a data retrieval query and depending on the type of the query, data is fetched from the non-relational database or relational database, and returned.

19. Computer software product, embodied in a non-transitory computer readable carrier medium, comprising instructions causing a computer to execute method items of claim 18.

20. The method of claim 18, wherein the relational database is a structured query language (SQL) database including subscriber related profile data, and the non-relational database is an in-memory database.

* * * * *